F. H. MAYER.
LEAF FOR FLY BOOKS.
APPLICATION FILED OCT. 7, 1914.
1,148,111.
Patented July 27, 1915.
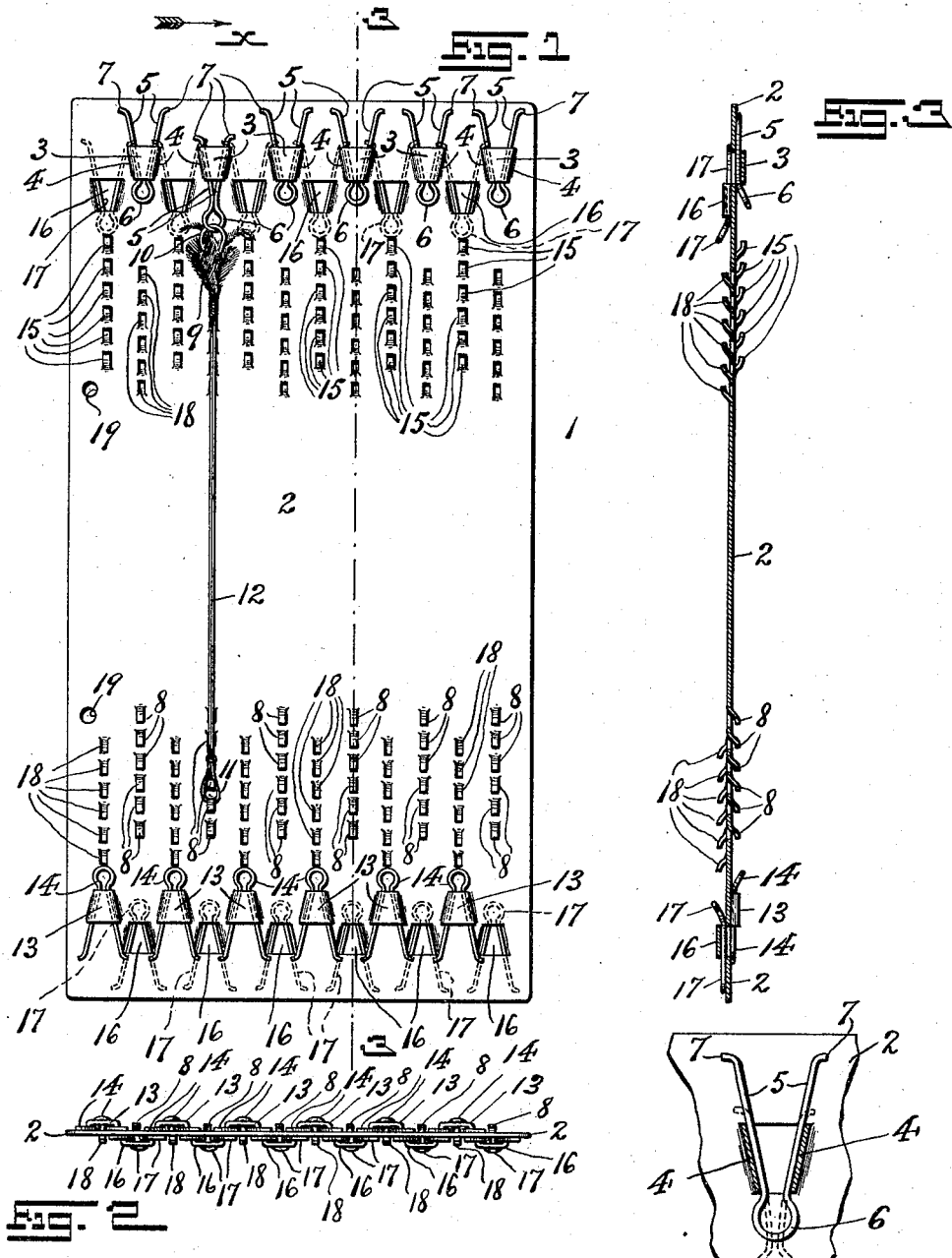
WITNESSES:
INVENTOR
Frank H. Mayer,
BY
ATTORNEYS

UNITED STATES PATENT OFFICE.

FRANK H. MAYER, OF ENGLEWOOD, COLORADO, ASSIGNOR TO ABBEY & IMBRIE, OF NEW YORK, N. Y., A CORPORATION OF NEW YORK.

LEAF FOR FLY-BOOKS.

1,148,111. Specification of Letters Patent. Patented July 27, 1915.

Application filed October 7, 1914. Serial No. 865,475.

*To all whom it may concern:*

Be it known that I, FRANK H. MAYER, a citizen of the United States, residing at Englewood, in the county of Arapahoe and State of Colorado, have invented certain new and useful Improvements in Leaves for Fly-Books; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in fly-books for fishermen; and the invention has reference, more particularly, to an improved and novel leaf for fly-books upon which fishing flies, gut-hooks, etc., can be conveniently secured and carried when not in use.

The invention has for its principal object to provide a novel construction of leaf for fly-books, any desired number of which may be secured together in a suitable binding or cover, each leaf being constructed to hold and carry a plurality of flies, or the like, in such a manner that each separate fly is individually secured and held in position upon the leaf, so that the same may be readily removed therefrom without disturbing the secured relation of any of the other flies to the leaf.

Another object of the present invention is to provide in connection with the leaves of fly-books a novel spring holding means adapted to engage the flies and place enough stretching tension upon the gut snells of the same to keep the said snells free from entanglement one with another, and also preventing said snells from curling or otherwise losing their desirable straight longitudinal extension from the flies to which they are connected.

Further objects of the present invention are to provide a leaf for fly-books which possesses a large carrying capacity; which is simple and cheap to manufacture; and which is practically indestructible.

Other objects of the present invention, not at this time more particularly enumerated, will be clearly understood from the following detailed description of the same.

With the various objects of the present invention in view, the same consists, primarily, in the novel construction of leaf for fly-books hereinafter set forth; and the invention consists, furthermore, in the novel arrangements and combinations of the various devices and parts, as well as in the details of the construction of the same, all of which will be more fully described in the following specification, and then finally embodied in the claims which are appended to and which form an essential part of this specification.

The invention is clearly illustrated in the accompanying drawings, in which:—

Figure 1 is a face view of one side of the novel leaf for fly-books made according to and embodying the principles of the present invention; Fig. 2 is a bottom edge view of said novel leaf; Fig. 3 is a longitudinal vertical section through the body of said leaf, and taken on line 3—3 in said Fig. 1, looking in the direction of the arrow *x*; and Fig. 4 is a large detail horizontal section through a guide-box of said leaf illustrating a spring retaining element in normal relation thereto.

Similar characters of reference are employed in all of the above described views, to indicate corresponding parts.

Referring now to the said drawings, the reference character 1 indicates the complete novel leaf for fly-books made according to and embodying the principles of the present invention, the same comprising a main flat body or sheet 2, which is preferably made of thin metal, but which may be made of any other material found to be suitable or desirable. Pressed outwardly from one side of the said body or sheet 2, so as to be disposed in a laterally extending row adjacent to the upper lateral marginal edge of said body or sheet 2, are a plurality of guide-boxes the tops 3 of which lie in a plane parallel to and spaced slightly away from said body or sheet 2, and the side walls 4 of each guide-box being disposed to incline toward each other and to converge toward the lower end of said guide-box. Each guide-box thus formed provides a space in which rides and is slidably disposed a spring retaining element.

Each spring retaining element comprises a body, preferably made of spring wire, doubled upon itself to form a pair of normally diverging spring-arms 5, the doubled end of said body being formed to provide a ring-like element or eye-member 6, the latter being inclined upwardly from the surface of said main body or sheet 2 so that its end is spaced slightly away from the main body or sheet 2 so that the same is conveniently presented to receive the hook portion of a fly or the like. The said spring retaining element thus formed is inserted through a guide-box, so that the diverging spring-arms 5 extend therethrough and bear against the inclined side walls 4 thereof. The tension of said diverging spring-arms 5, as they bear against the inclined side walls 4 of the guide-box, tends to move the spring retaining element upwardly through the guide-box until the same is stopped by the engagement of its eye-member 6 with the lower marginal edge of the guide-box. Each spring-arm 5 of said spring retaining element is provided at its free end with an outwardly bent or projected portion forming stops 7, which serve to retain said spring retaining elements from being drawn through or removed from their guide-boxes. Pressed out from the said body or sheet 2, in alinement with each spring retaining element are a plurality of hook-like elements 8. To secure the fly 9 upon the leaf, the hook-portion 10 thereof is inserted through an eye-member 6 of a spring retaining element, and then the loop 11 of the gut-snell 12 of the fly is hooked over a hook-like element 8, in such a manner as to draw downwardly through the guide-box the divergent spring-arms 5 of the spring retaining element to which said hook-portion is connected. Thereupon the tendency of said divergent spring-arms 5 of the spring retaining element is to move the latter upwardly through the guide-box, or back to normal initial position, and thereby tends to place a slight stretching tension upon the gut-snell 12, whereby the same is stretched taut and straight, and thus guarded against entanglement with the snells of other adjoining flies affixed to the leaf. One of the chief advantages of the novel spring retaining element above described lies in the character of its tension and its stretching action upon the snells of the flies, since such tension is very slight, although perfectly sufficient to maintain the snell taut and straight without placing undue strain upon said snells. In like manner, as above described, a plurality of guide-boxes 13 are pressed outwardly from the same side of the main body or sheet 2, and disposed in a horizontal or lateral row adjacent to the lower lateral edge of said main body or sheet 2, and arranged in said guide-boxes 13 are spring retaining elements 14 of the same construction as above described. Also pressed out from the body or sheet 2 are a plurality of vertical rows of hook-like elements 15, which coöperate with said spring retaining elements in securing flies to the leaf.

If desired rows of guide-boxes 16 are pressed out of said main body or sheet 2 so as to extend outwardly from the opposite side of said main body or sheet 2, the same being located preferably, in staggered relation to the members of the rows of guide-boxes above described and adjacent thereto, each guide-box 16 having a spring retaining element 17 of the same construction as above described. Also pressed out from the opposite side of said main body or sheet 2, in proper locations so as to properly coöperate with the spring retaining elements 17, are a plurality of vertical rows of hook-like elements 18.

Of course, it will be readily understood, that the arrangement and disposition of the different sets of spring retaining elements and hook-like elements coöperating therewith, may be variously modified without departing from the scope of the present invention.

Said main body or sheet 2 may be provided with suitably disposed perforations 19 adjacent to one longitudinal edge of the same, which may serve to receive the connecting or binding elements of a suitable binding or cover, so that a plurality of leaves embodying the novel construction above set forth may be suitably bound together.

Of course it will be apparent that the leaves may be bound either permanently or removably in a binding, and in the latter case by adding leaves to the binding the capacity of the fly-book formed by a plurality of the same may be increased at will.

It will also be understood that I do not limit myself to the use of the perforations 19, since it will be apparent that the novel leaves may be provided with any other desirable means for connecting the same together in a common binding or cover.

I am aware that some changes may be made in the general arrangements and combinations of the various devices and parts, as well as in the details of the construction of said parts, without departing from the scope of the present invention as set forth in the foregoing specification and as defined in the appended claims. Hence, I do not limit my invention to the exact arrangements and combinations of the devices and parts as described in the foregoing specification, nor do I confine myself to the exact details of the construction of the said parts as illustrated in the accompanying drawings.

I claim:—

1. In a device of the kind described, a main sheet, a spring-body doubled upon itself to provide a pair of divergent spring arms, means located at the connected ends of said spring arms adapted to be engaged by one end of a fly, fish-hook or the like, a guide-means connected with said main sheet in which said spring arms are slidably supported, and means on said main sheet alined with said spring-body adapted to be engaged by the opposite end of a fly, fish-hook or the like.

2. In a device of the kind described, a main sheet, a plurality of spring retaining elements spaced laterally upon said main sheet adjacent to an end thereof, said spring retaining elements each comprising a spring-body doubled upon itself to provide a pair of divergent spring arms, means located at the connected ends of said spring-arms adapted to be engaged by one end of a fly, fish-hook or the like, a plurality of guide-means connected with said main sheet in which said spring-arms of said spring retaining elements are slidably supported, and a plurality of vertically disposed hook-like elements connected with said main sheet and alined vertically with said spring retaining elements, said hook-like elements being adapted to be engaged by the opposite end of a fly, fish-hook or the like.

3. In a leaf for fly-books, a guide-box connected with said leaf, said guide-box having side walls inclining toward each other from one end of the guide-box to the other, a spring retaining element movably mounted in said guide-box, the same comprising a spring body doubled upon itself to provide a pair of divergent spring arms, the spring tension of said spring arms against the side walls of said guide-box tending to move said spring retaining element in one direction through said guide-box, stop-means at the outer extremities of said spring arms adapted to limit the movement of said spring retaining element through said guide-box in the opposite direction, the connected ends of said spring arms being formed to provide an eye-member adapted to be engaged by the hook-portion of a fly, fish-hook or the like, and means connected with said leaf for engaging the snell of a fly, fish-hook or the like.

4. In a leaf for fly-books, laterally extending rows of guide-boxes projecting from both sides of said leaf and adjacent to its upper and lower lateral marginal edges, a spring retaining element mounted in each guide box comprising a spring-body doubled upon itself to provide a pair of divergent spring-arms slidably supported in said guide-boxes, each spring retaining element having an eye-member adapted to be engaged by the hook-portion of a fly, fish-hook or the like, and means projecting from each side of said leaf for engaging the snell of flies, fish-hooks or the like.

5. In a leaf for fly-books, laterally extending rows of guide-boxes projecting from both sides of said leaf and adjacent to its upper and lower lateral marginal edges, a spring retaining element mounted in each guide box comprising a spring-body doubled upon itself to provide a pair of divergent spring-arms slidably supported in said guide-boxes, stop means at the extremities of said spring-arms adapted to prevent the withdrawal of said spring retaining elements from said guide-boxes, each spring retaining element having an eye-member adapted to be engaged by the hook-portion of a fly, fish-hook or the like, and a plurality of vertically disposed rows of hook-like elements projecting from each side of said leaf, said vertical rows of hook-like elements being in alinement with and longitudinally spaced from the eye-members of said spring retaining elements and adapted to be engaged by the snell of a fly, fish-hook or the like.

6. In a leaf for fly books, laterally extending rows of guide-boxes projecting from both sides of said leaf and adjacent to its upper and lower lateral marginal edges, each guide-box having side-walls inclining toward each other from one end of the guide-box to the other, a spring retaining element movably mounted in each guide-box, the same comprising a spring body doubled upon itself to provide a pair of divergent spring arms, the spring tension of said spring-arms against the side walls of said guide-box tending to move said spring retaining element in one direction through said guide-box, stop-means at the outer extremities of said spring arms adapted to limit the movement of said spring retaining element through said guide-box in the opposite direction, the connected ends of said spring arms being formed to provide an eye-member adapted to be engaged by the hook-portion of a fly, fish-hook or the like, and means projecting from each side of said leaf for engaging the snells of flies, fish-hooks or the like.

7. A spring retaining element for the leaves of fly-books comprising, a spring-body doubled upon itself to provide a pair of divergent spring arms, the connected ends of said spring arms being formed to provide an eye-member adapted to receive the engagement of the hook-member of a fly, fish-hook or the like, a guide-means in which said spring arms are slidably supported, and stop-means at the extremities of said spring-arms for preventing the withdrawal of the same from said guide means.

In testimony, that I claim the invention set forth above I have hereunto set my hand this twenty-eighth day of September, 1914.

FRANK H. MAYER.

Witnesses:
Jos. F. Sellers,
Arthur N. Mayer.